(12) United States Patent
Tabata et al.

(10) Patent No.: US 9,289,749 B2
(45) Date of Patent: Mar. 22, 2016

(54) POLYCONDENSATION CATALYST FOR PRODUCING POLYESTER AND PRODUCTION OF POLYESTER USING THE POLYCONDENSATION CATALYST

(71) Applicant: SAKAI CHEMICAL INDUSTRY CO., LTD., Osaka (JP)

(72) Inventors: Keiichi Tabata, Osaka (JP); Akihiro Kamon, Osaka (JP); Keiichi Ikegawa, Osaka (JP); Jun Naito, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 255 days.

(21) Appl. No.: 13/955,529

(22) Filed: Jul. 31, 2013

(65) Prior Publication Data

US 2014/0073758 A1 Mar. 13, 2014

Related U.S. Application Data

(60) Provisional application No. 61/849,844, filed on Jul. 31, 2012.

(51) Int. Cl.
| | | |
|---|---|---|
| *B01J 21/10* | (2006.01) | |
| *B01J 21/06* | (2006.01) | |
| *C08G 63/85* | (2006.01) | |
| *C08G 63/84* | (2006.01) | |

(52) U.S. Cl.
CPC ............... *B01J 21/063* (2013.01); *B01J 21/066* (2013.01); *B01J 21/10* (2013.01); *C08G 63/84* (2013.01); *C08G 63/85* (2013.01)

(58) Field of Classification Search
CPC .......... B01J 21/04; B01J 21/066; B01J 21/08; B01J 21/063; B01J 21/10; B01J 21/14; B01J 21/12; B01J 37/0244; C08G 63/00–63/918
USPC ................ 502/350, 527.12, 527.15
See application file for complete search history.

(56) References Cited

U.S. PATENT DOCUMENTS

2010/0041913 A1* 2/2010 Umaba ................. B01J 21/063
560/202
2011/0306747 A1 12/2011 Hashimoto et al.

FOREIGN PATENT DOCUMENTS

| JP | 38-2143 | 3/1963 |
|---|---|---|
| JP | 46-3395 | 1/1971 |
| JP | 49-57092 | 6/1974 |
| JP | 63-243126 | 10/1988 |
| JP | 9-291141 | 11/1997 |
| JP | 2001-64377 | 3/2001 |
| JP | 2001-114885 | 4/2001 |
| JP | 2006-188567 | 7/2006 |
| JP | 2008-7588 | 1/2008 |
| WO | 2008/001473 | 1/2008 |

OTHER PUBLICATIONS

Office Action issued May 10, 2013 in U.S. Appl. No. 13/562,746.

* cited by examiner

*Primary Examiner* — Melvin C Mayes
*Assistant Examiner* — James Corno
(74) *Attorney, Agent, or Firm* — Wenderoth, Lind & Ponack, L.L.P.

(57) ABSTRACT

The invention provides a polycondensation catalyst for producing polyester by an esterification reaction or a transesterification reaction between a dicarboxylic acid or an ester-forming derivative thereof and a glycol, wherein the polycondensation catalyst comprises particles of a solid base having on the surfaces an inner coating layer of titanic acid in an amount of from 0.1 to 50 parts by weight in terms of $TiO_2$ per 100 parts by weight of the solid base, and an outer coating layer either of an oxide of at least one element selected from aluminum, zirconium and silicon, or of a composite oxide of at least two elements selected from aluminum, zirconium and silicon on the surface of the inner coating layer in an amount of from 1 to 50 parts by weight per 100 parts by weight of the solid base.

9 Claims, No Drawings

POLYCONDENSATION CATALYST FOR PRODUCING POLYESTER AND PRODUCTION OF POLYESTER USING THE POLYCONDENSATION CATALYST

TECHNICAL FIELD

The present invention relates to a polycondensation catalyst for producing polyester and production of polyester using the polycondensation catalyst. The invention further relates to polyester obtained using the polycondensation catalyst.

BACKGROUND ART

Polyesters typified by polyethylene terephthalate, polybutylene terephthalate and polyethylene naphthalate excel in mechanical properties and chemical properties, and depending upon their properties, they are used in a wide variety of fields including fibers for clothes and industrial materials, films or sheets for packaging materials or magnetic tapes, bottles, which are hollow molded articles, casings of electric or electronic appliances, and other types of molded articles or components.

A representative polyester, namely, a polyester composed of an aromatic dicarboxylic acid component and an alkylene glycol component as major constituents, such as polyethylene terephthalate, is produced by first preparing bis(2-hydroxyethyl)-terephthalate (BHET) and an oligomer containing the same by an esterification reaction between terephthalic acid and ethylene glycol or a transesterification reaction between dimethyl terephthalate and ethylene glycol, and then subjecting the oligomer to melt-polycondensation in a vacuum at high temperatures in the presence of a polycondensation catalyst.

For use in production of biaxially stretched bottles made from polyester known as "plastic bottles", a polyester having a higher molecular weight than polyesters used for fibers and films are needed so that the resulting bottles have enough strength. Accordingly, a polyester having a higher molecular weight which is obtained by solid-polycondensation of polyester obtained as melt-polycondensate is used.

As such a polycondensation catalyst for producing polyester, antimony trioxide has been heretofore widely used. Antimony trioxide is a catalyst which is inexpensive and is of excellent catalytic activity; however, it has some problems. For example, antimony metal is deposited while it is used in polycondensation of polyester raw materials, thereby making the resulting polyester darkened, or the resulting polyester is contaminated with the antimony metal deposited.

It is already known that in production of polyester, coloration of polyester obtained is prevented when an alkali such as sodium hydroxide or potassium hydroxide is present in the reaction system together with a catalyst (see patent literature 1). In the case of antimony trioxide catalyst, too, it is already known that color tone of polyester obtained can be improved by co-use of a predetermined amount of sodium oxide together with an iron oxide (see patent literature 2). However, because antimony trioxide is inherently poisonous, development of catalysts free of antimony has been awaited in recent years.

Under these circumstances, as a polycondensation catalyst for producing polyester by a transesterification reaction between dimethyl terephthalate and ethylene glycol, a glycol titanate (see patent literature 3) and a tetraalkoxy titanium (see patent literature 4) have been proposed, for example. In recent years, there has been proposed as a polycondensation catalyst a solid titanium compound which is obtained by hydrolyzing a titanium halide or a titanium alkoxide to prepare a hydroxide of titanium, and then dehydrating and drying the hydroxide by heating it at a temperature of from 30° C. to 350° C. (see patent literatures 5 and 6).

The titanium-based catalysts described above have high polymerization activity in many cases. However, coloration to yellow is seen in the resulting polyester obtained by using such titanium-based catalysts. Furthermore, the resulting polyester is liable to be colored due to thermal degradation during the stage of melt-molding. There is also a tendency that the resulting polyester is poor in transparency.

In order to solve the above-mentioned problems, a titanic acid catalyst having a particulate structure which comprises a particle of a solid base such as magnesium hydroxide and hydrotalcite having on the surface a coating formed of titanic acid (see patent literature 7).

Such a titanic acid catalyst having a particulate structure provides polyester superior in color tone and transparency at a polymerization activity equal to or higher than the antimony trioxide catalyst in production of polyester by melt-polycondensation of polyester raw materials. In particular, the titanic acid catalyst has a higher polymerization activity than the antimony trioxide catalyst from the point of view of polycondensation rate in melt-polycondensation of polyester raw materials.

However, when the polyester obtained by using the titanic acid catalyst is subjected to solid-polycondensation to obtain a polyester having a higher molecular weight, it has been found that the catalyst leaves much room for improvement in catalytic activity, in particular, in terms of a polycondensation rate as compared with the antimony trioxide catalyst.

PRIOR ART DOCUMENTS

Patent Literatures

Patent Literature 1: JP 38-2143 B
Patent Literature 2: JP 9-291141 A
Patent Literature 3: JP 46-3395 B
Patent Literature 4: JP 49-57092 A
Patent Literature 5: JP 2001-64377 A
Patent Literature 6: JP 2001-114885 A
Patent Literature 7: JP 2006-188567 A

SUMMARY OF THE INVENTION

Problem to be Solved by the Invention

The present inventors have made an intensive study in order to solve the above-mentioned various problems involved in the conventional polycondensation catalysts for producing polyester, in particular, such problems involved in the above-mentioned titanic acid catalyst. As a result, they have reached the present invention by finding that when an inner coating layer of titanic acid is formed on the surfaces of particles of a solid base and an outer coating layer of an oxide of at least one element selected from aluminum, zirconium and silicon, or of a composite oxide of at least two elements selected from aluminum, zirconium and silicon, is formed on the surface of the inner coating layer, each layers at predetermined proportions in weight relative to the weight of the solid base, and such a product, that is, the particles of a solid base having on the surfaces the inner and the outer coating layers, is used as a polycondensation catalyst for producing polyester, decomposition of polyester during melt-polycondensation is controlled thereby to provide polyester excellent in color tone at a polymerization activity higher than the conventional antimony trioxide catalyst.

Moreover, the inventors have found that also in solid-polycondensation, the above-mentioned product or the polycondensation catalyst provides polyester which has high molecular weight and excellent color tone at a polymerization activity or a polycondensation rate substantially equal to that of the antimony trioxide catalyst, and higher than that of the titanic acid catalyst.

Therefore, it is an object of the invention to provide a novel polycondensation catalyst for producing polyester which not only exhibits high catalytic activity and provides polyester with excellent color tone even in the absence of antimony as a melt-polymerization catalyst, but also exhibits high catalytic activity, in particular, high polycondensation rate, and provides polyester with excellent color tone in solid-polycondensation as well.

It is a further object of the invention to provide a method for producing such a polycondensation catalyst. It is still a further object of the invention to provide polyester obtained using such a polycondensation catalyst, and a method for producing polyester using such a polycondensation catalyst.

Means to Solve the Problems

The invention provides a polycondensation catalyst for producing polyester by an esterification reaction or a transesterification reaction between a dicarboxylic acid or an ester-forming derivative thereof and a glycol, wherein the polycondensation catalyst comprises particles of a solid base having on the surfaces an inner coating layer of titanic acid in an amount of from 0.1 to 50 parts by weight in terms of $TiO_2$ per 100 parts by weight of the solid base, and an outer coating layer either of an oxide of at least one element selected from aluminum, zirconium and silicon, or of a composite oxide of at least two elements selected from aluminum, zirconium and silicon on the surface of the inner coating layer in an amount of from 1 to 50 parts by weight per 100 parts by weight of the solid base.

Among the polycondensation catalysts mentioned above, the catalyst comprising particles of a solid base having on the surfaces an inner coating layer of titanic acid and an outer coating layer either of an oxide of at least one element selected from aluminum and zirconium, or of a composite oxide of aluminum and zirconium on the surface of the inner coating layer is obtained according to the invention by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from an water-soluble aluminum salt and a water-soluble zirconium salt, and an aqueous solution of an alkali to the resulting aqueous slurry of the particles of the solid base thereby to form an outer coating layer of an oxide of at least one element selected from aluminum and zirconium, or of a composite oxide of aluminum and zirconium on the surface of the inner coating layer; and filtering the aqueous slurry of the particles of the solid base having the inner coating layer and the outer coating layer thereon, washing with water and drying the obtained cake, followed by disintegrating the obtained dried product.

Among the polycondensation catalysts mentioned above, the catalyst comprising particles of a solid base having on the surfaces an inner coating layer of titanic acid and an outer coating layer of an oxide of silicon on the surface of the inner coating layer is obtained according to the invention by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of a water-soluble silicate and an acid to the resulting aqueous slurry of the particles of the solid base thereby to form an outer coating layer of an oxide of silicon on the surface of the inner coating layer; and filtering the aqueous slurry of the particles of the solid base having the inner coating layer and the outer coating layer thereon, washing with water and drying the obtained cake, followed by disintegrating the obtained dried product.

Among the polycondensation catalysts mentioned above, the catalyst comprising particles of a solid base having on the surfaces an inner coating layer of titanic acid and an outer coating layer of a composite oxide of at least one element selected from aluminum and zirconium, and silicon on the surface of the inner coating layer is obtained according to the invention by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from an water-soluble aluminum salt and a water-soluble zirconium salt, and an aqueous solution of a water-soluble silicate to the resulting aqueous slurry of the particles of the solid base thereby to form an outer coating layer of a composite oxide of at least one element selected from aluminum and zirconium, and silicon on the surface of the inner coating layer; and filtering the aqueous slurry of the particles of the solid base having the inner coating layer and the outer coating layer thereon, washing with water and drying the obtained cake, followed by disintegrating the obtained dried product.

The invention provides a method for producing polyester comprising subjecting a dicarboxylic acid or an ester-forming derivative thereof and a glycol to melt-polycondensation in the presence of the polycondensation catalyst described above.

The invention provides a method for producing polyester comprising preparing an oligomer comprising a bis(hydroxyalkyl)ester of an aromatic dicarboxylic acid by an esterification reaction or a transesterification reaction between the aromatic dicarboxylic acid or an ester-forming derivative thereof and an alkylene glycol, and then subjecting the oligomer to melt-polycondensation in the presence of the polycondensation catalyst mentioned above.

The invention also provides a method for producing polyester comprising further subjecting the polyester obtained in such a manner as mentioned above to solid-polycondensation in the presence of the polycondensation catalyst mentioned above.

The invention further provides polyester produced by a method as described above.

Effect of the Invention

In the production of polyester by an esterification reaction or a transesterification reaction between a dicarboxylic acid or its ester-forming derivative and a glycol, the melt-polycondensation using the polycondensation catalyst for producing polyester according to the invention makes it possible to obtain polyester excellent in color tone at a high polymerization activity without making the polyester darkened or causing decomposition of the polyester. In addition, the use of the polycondensation catalyst for producing polyester according to the invention in solid-polycondensation makes it possible to obtain polyester having higher molecular weight and excellent color tone at a high polymerization activity, that is, at a high polycondensation rate.

EMBODIMENTS OF THE INVENTION

The polycondensation catalyst for producing polyester according to the invention is a polycondensation catalyst for producing polyester by an esterification reaction or a transesterification reaction between a dicarboxylic acid or an ester-forming derivative thereof and a glycol. The polycondensation catalyst comprises particles of a solid base having on the surfaces an inner coating layer of titanic acid in an amount of from 0.1 to 50 parts by weight in terms of $TiO_2$ per 100 parts by weight of the solid base, and an outer coating layer either of an oxide of at least one element selected from aluminum, zirconium and silicon, or of a composite oxide of at least two elements selected from aluminum, zirconium and silicon on the surface of the inner coating layer in an amount of from 1 to 50 parts by weight per 100 parts by weight of the solid base.

Herein the invention, the oxide or the composite oxide mentioned above may contain in part hydroxides.

In the invention, examples of the solid base include oxides, hydroxides or various composite oxides of alkali metals or alkaline earth metals, and oxides or composite oxides of aluminum, zinc, lanthanum, zirconium, thorium and the like. Such oxides and composite oxides may be replaced partially by salts such as carbonates. Therefore, in the invention, more specific examples of the solid base include oxides and hydroxides of magnesium, calcium, strontium, barium, aluminum, zinc and the like, e.g., magnesium hydroxide, calcium oxide, strontium oxide, barium oxide, zinc oxide and the like, and composite oxides such as hydrotalcite. In particular, magnesium hydroxide or hydrotalcite is preferably used as a solid base according to the invention.

In the invention, titanic acid is a hydrous titanium oxide represented by the general formula

$TiO_2 \cdot nH_2O$ wherein n is a number satisfying $0 < n \leq 2$. Such a titanic acid can be obtained, for example, by hydrolysis of a certain kind of titanium compounds as described later.

In the polycondensation catalyst according to the invention, when the amount of the inner coating layer of titanic acid is less than 0.1 parts by weight in terms of $TiO_2$ per 100 parts by weight of the solid base, the resulting polycondensation catalyst has a low polymerization activity. On the other hand, when the amount of the inner coating layer of titanic acid is more than 50 parts by weight in terms of $TiO_2$ per 100 parts by weight of the solid base, decomposition of polyester occurs easily during the production of the polyester and coloring of the resulting polyester due to its thermal degradation occurs easily during the melt-molding of the polyester.

When the amount of the outer coating layer of an oxide of at least one element selected from aluminum, zirconium and silicon, or of a composite oxide of at least two elements selected from aluminum, zirconium and silicon is less than 1 part by weight per 100 parts by weight of the solid base, the resulting polycondensation catalyst has a high polymerization activity, but the color tone of the resulting polyester is not improved. On the other hand, when the amount of the outer coating layer is more than 50 parts by weight in terms of an oxide per 100 parts by weight of the solid base, the polymerization activity of the resulting polycondensation catalyst decreases undesirably.

The production of the polycondensation catalysts of the invention is described below.

Among the polycondensation catalysts of the invention, the catalyst comprising particles of a solid base having on the surfaces an inner coating layer of titanic acid and an outer coating layer either of an oxide of at least one element selected from aluminum and zirconium, or of a composite oxide of aluminum and zirconium on the surface of the inner coating layer is obtained by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from an water-soluble aluminum salt and a water-soluble zirconium salt, and an aqueous solution of an alkali to the resulting aqueous slurry of the particles of the solid base thereby to form an outer coating layer of an oxide of at least one element selected from aluminum and zirconium, or of a composite oxide of aluminum and zirconium on the surface of the inner coating layer; and filtering the aqueous slurry of the particles of the solid base having the inner coating layer and the outer coating layer thereon, washing with water and drying the obtained cake, followed by disintegrating the obtained dried product.

Among the polycondensation catalysts of the invention, the catalyst comprising particles of a solid base having on the surfaces an inner coating layer of titanic acid and an outer coating layer of an oxide of silicon on the surface of the inner coating layer is obtained by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of a water-soluble silicate and an acid to the resulting aqueous slurry of the particles of the solid base thereby to form an outer coating layer of an oxide of silicon on the surface of the inner coating layer; and filtering the aqueous slurry of the particles of the solid base having the inner coating layer and the outer coating layer thereon, washing with water and drying the obtained cake, followed by disintegrating the obtained dried product.

Among the polycondensation catalysts of the invention, the catalyst comprising particles of a solid base having on the surfaces an inner coating layer of titanic acid and an outer coating layer of a composite oxide of at least one element selected from aluminum and zirconium, and silicon, on the surface of the inner coating layer is obtained by:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from an water-soluble aluminum salt and a water-soluble zirconium salt, and an aqueous solution of a water-soluble silicate to the resulting aqueous slurry of the particles of the solid base thereby to form an outer coating layer of a composite oxide of at least one element selected from aluminum and zirconium, and silicon on the surface of the inner coating layer; and filtering the aqueous slurry of the particles of the solid base having the inner coating layer and the outer coating layer thereon, washing with water and drying the obtained cake, followed by disintegrating the obtained dried product.

In the preparation of the above-mentioned polycondensation catalyst according to the invention, the inner coating layer and the outer coating layer are formed in this order on the surface of a particle of the solid base, and then the particle is dried. The temperature at which the particle of the solid base is dried is preferably within the range of from 60° C. to 180° C., and particularly preferably within the range of from 100° C. to 130° C.

The disintegration of the dried product mentioned above is to loosen, or lightly disperse and crush the dried product. The dried product may be disintegrated, for example, by treating it with a crusher such as an air mil, although not limited thereto. In this way, the polycondensation catalyst of the invention usually has an average particle diameter in the range of about 0.3 μm to 0.5 μm.

Examples of the titanic compound to form the inner coating layer of titanic acid on the surface of a particle of the solid base include titanium halides such as titanium tetrachloride, titanates such as titanylammonium oxalate, and titanium alkoxides such as titanium tetraisopropoxide. The titanic compound usable, however, is not limited to these examples.

Examples of the water-soluble aluminum salts to form an outer coating layer on the surface of the inner coating layer include aluminum salts such as aluminum sulfate and aluminum chloride, and alkali metal aluminates such as sodium aluminate and potassium aluminate. Examples of the water-soluble zirconium salt include zirconium oxychloride and zirconium trichloride. Examples of the water-soluble silicates include sodium silicate and potassium silicate. However, the water-soluble aluminum salts, zirconium salts and silicates are not limited to those mentioned above.

An alkali or an acid which is used to hydrolyze the titanium compound to form the inner coating layer of titanic acid, or to hydrolyze the aluminum salt, zirconium salt or silicate to form the outer coating layer either of an oxide of at least one element selected from aluminum, zirconium and silicon, or of a composite oxide of at least two elements selected from aluminum, zirconium and silicon is not specifically limited. Examples of the alkali include aqueous solution of sodium hydroxide or potassium hydroxide, and examples of the acid include sulfuric acid, nitric acid, acetic acid, hydrochloric acid, phosphoric acid, and so on.

In the polycondensation catalyst of the invention, the solid base is preferably magnesium hydroxide or hydrotalcite, as described hereinbefore.

The aqueous slurry of particles of magnesium hydroxide used in preparation of the polycondensation catalyst of the invention refers to, for example, an aqueous slurry obtained by neutralizing an aqueous solution of a water-soluble magnesium salt such as magnesium chloride and magnesium nitrate with an alkali such as sodium hydroxide and ammonia to precipitate magnesium hydroxide, or an aqueous slurry obtained by dispersing particles of magnesium hydroxide in water. When an aqueous slurry of magnesium hydroxide is prepared by neutralizing an aqueous solution of a water-soluble magnesium salt with an alkali, the aqueous solution of the water-soluble magnesium salt and the alkali may be subjected to simultaneous neutralization, or alternatively neutralization may be conducted by adding one to the other.

The particles of magnesium hydroxide mentioned above may be derived from any source. For example, they may be powder obtained by pulverizing natural ore or powder obtained by neutralizing an aqueous magnesium salt solution with an alkali.

The hydrotalcite used in the invention is preferably represented by the following general formula (I):

$$M^{2+}{}_{1-x}M^{3+}{}_{x}(OH^-)_2 A^{n-}{}_{x/n} \cdot mH_2O \quad (I)$$

wherein $M^{2+}$ denotes at least one divalent metal ion selected from $Mg^{2+}$, $Zn^{2+}$ and $Cu^{2+}$; $M^{3+}$ denotes at least one trivalent metal ion selected from $Al^{3+}$, $Fe^{3+}$ and $Ti^{3+}$; $A^{n-}$ denotes at least one anion selected from $SO_4^{2-}$, $Cl^-$, $CO_3^{2-}$ and $OH^-$; n denotes the valence of the anion; x is a number satisfying $0<x<0.5$; and m is a number satisfying $0 \leq m<2$.

In particular, in the invention, a hydrotalcite in which $M^{2+}$ is $Mg^{2+}$, $M^{3+}$ is $Al^{3+}$ and $A^{n-}$ is $CO_3^{2-}$, i.e., one represented by the general formula (II) is preferably used:

$$Mg^{2+}{}_{1-x}Al^{3+}{}_{x}(OH^-)_2(CO_3^{2-})_{x/2} \cdot mH_2O \quad (II)$$

wherein x and m have meanings the same as those mentioned above. Although such a hydrotalcite can be obtained easily as a product in the market, it can also be produced, if necessary, by a conventionally known method, e.g. a hydrothermal method, using proper materials.

An aqueous slurry of hydrotalcite used in the invention refers to, for example, an aqueous slurry obtained by dispersing particles of hydrotalcite mentioned above in water.

In the production of polyester according to the invention, examples of the dicarboxylic acid include aliphatic dicarboxylic acids exemplified by succinic acid, glutaric acid, adipic acid and dodecanedicarboxylic acid and their ester-forming derivatives such as dialkyl esters; and aromatic dicarboxylic acids exemplified by terephthalic acid, isophthalic acid and naphthalene dicarboxylic acid and their ester-forming derivatives such as dialkyl esters. In the invention, examples of the glycol include ethylene glycol, propylene glycol, diethylene glycol, triethylene glycol, butylene glycol and 1,4-cyclohexanedimethanol.

Among the examples provided above, for example, aromatic dicarboxylic acids such as terephthalic acid, isophthalic acid and naphthalene dicarboxylic acid are preferably used as the dicarboxylic acid; and alkylene glycols such as ethylene glycol, propylene glycol and butylene glycol are preferably used as the glycol.

Therefore, in the invention, specific examples of preferred polyesters include polyethylene terephthalate, polybutylene terephthalate, polypropylene terephthalate, polyethylene naphthalate, polybutylene naphthalate, polypropylene naphthalate and poly(1,4-cyclohexanedimethylene terephthalate).

In the invention, however, neither the dicarboxylic acid or its ester-forming derivative nor the glycol is limited to the examples listed above. Further, the resulting polyester is not limited to the examples shown above.

In general, such a polyester as represented by polyethylene terephthalate has been produced by the following methods. A first method comprises producing a low molecular weight oligomer containing the aforementioned BHET by a direct esterification of a dicarboxylic acid represented by terephthalic acid with a glycol represented by ethylene glycol, and subjecting the oligomer to melt-polycondensation in the presence of a polycondensation catalyst under a high vacuum at a high temperature to yield polyester with a desired molecular weight. A second method comprises preparing, like the foregoing method, a low molecular weight oligomer containing the aforementioned BHET by a transesterification reaction between a dialkyl terephthalate represented by dimethyl terephthalate and a glycol represented by ethylene glycol, and subjecting the oligomer to melt-polycondensation in the presence of a polycondensation catalyst under a high vacuum at a high temperature to yield polyester with a desired molecular weight.

The polycondensation catalyst of the invention is used in an amount usually in the range from $3\times10^{-4}$ to $3\times10^{-2}$ parts by weight in relation to 100 parts by weight of low molecular weight oligomer (which is often referred simply to a low molecular weight oligomer hereunder) which is obtained by an esterification reaction or a transesterification reaction between a dicarboxylic acid or an ester-forming derivative thereof and a glycol. When the amount of the polycondensation catalyst is less than $3\times10^{-4}$ parts by weight in relation to 100 parts by weight of the low molecular weight oligomer, sufficient catalytic activity is not exerted so that polyester having a desired high molecular weight may not be obtained. On the other hand, when the amount of the polycondensation catalyst is more than $3\times10^{-2}$ parts by weight in relation to 100 parts by weight of the low molecular weight oligomer, the resulting polyester may be inferior in heat stability.

Also in the invention, a polyester can be obtained by producing a low molecular weight oligomer containing BHET by the above-mentioned direct esterification reaction or transesterification reaction, and then subjecting the oligomer to melt-polycondensation in the presence of the polycondensation catalyst of the invention under a high vacuum at a high temperature in the conventionally known manner as described above. According to the invention, when the polyester thus obtained is subjected to solid-polycondensation in vacuum or under an inert gas atmosphere at a temperature lower than the melting point of the polyester provides a polyester having a much higher molecular weight.

For example, polyethylene terephthalate is produced as follows. When a transesterification reaction method is employed, in accordance with an ordinary method, as conventionally known, a low molecular weight oligomer containing BHET is obtained by feeding dimethyl terephthalate and ethylene glycol into a reactor, if necessary, together with a catalyst such as calcium acetate, heating them under a normal pressure to react them together at a reflux temperature while distilling off methanol from the reaction system. The oligomer thus obtained has a degree of polymerization usually up to about 10. If necessary, the reaction may be conducted under pressure. The reaction can be traced by measuring the amount of methanol distilled. The esterification ratio is usually about 95%.

When a direct esterification reaction is employed, in accordance with an ordinary method, as conventionally known, a low molecular weight oligomer containing BHET is obtained by feeding terephthalic acid and ethylene glycol into a reactor and heating them, if necessary under pressure, while distilling off the water formed. In the direct esterification reaction, it is preferable to add a previously prepared low molecular weight oligomer containing BHET together with raw materials into a reactor and carry out the direct esterification reaction in the presence of the low molecular weight oligomer.

Subsequently, the thus obtained low molecular weight oligomer is transferred to a polymerization reactor and is heated under reduced pressure to a temperature higher than the melting point of polyethylene terephthalate (typically 240° C. to 280° C.), for example, to a temperature of 280° C. to 290° C. Thus, the oligomer is melt-polycondensed while unreacted ethylene glycol and ethylene glycol resulting from the reaction are distilled off from the reaction system under monitoring of the viscosity of the molten reactants.

According to necessity, the polycondensation reaction may be carried out by using a plurality of reactors and changing the reaction temperature and pressure optimally in each reactor. When the viscosity of the reaction mixture reaches a predetermined value, the pressure reduction is stopped and the pressure in the polymerization reactor is returned to a normal pressure with nitrogen gas. Then, the resulting polyester is discharged from the reactor, for example, in a form of strand, cooled rapidly with water, and cut to pellets. According to the invention, polyester having an intrinsic viscosity (Iv) of from 0.5 to 0.7 dL/g is obtained in this way.

A polyester to be used for production of plastic bottles requires to have a molecular weight higher than that of a polyester, for example, for fiber and film applications. As already known, such a polyester having a higher molecular weight can be obtained by solid-polycondensation of polyester obtained as melt-polycondensate. Thus, according to the invention, the polyester obtained as melt-polycondensate is heated under vacuum or under an inert gas or carbon dioxide atmosphere at a temperature lower than the melting point of the melt-polycondensate, that is, the melt-polycondensate is subjected to solid-polycondensation, thereby a polyester having a higher molecular weight is obtained as solid-polycondensate.

That is, a polyester having a higher molecular weight can be obtained by subjecting melt-polycondensate to solid-polycondensation in the presence of the polycondensation catalyst, as the solid-polycondensation of polyester obtained as melt-polycondensate is already known as a method for producing a polyester having a higher molecular weight. Usually polyester obtained as melt-polycondensate is subjected to solid-polycondensation, and accordingly, the polyester or the melt-polycondensate used already contains the polycondensation catalyst therein.

In more detail, the solid-polycondensation of polyester comprises drying pellets of polyester, which has been obtained in the melt-polycondensation, under vacuum or under a stream of an inert gas or carbon dioxide at a temperature of from 100° C. to 200° C., crystallizing the polyester by heating the pellets at a temperature of from 150° C. to 200° C., and then solid-polycondensing the polyester by heating the polyester at a temperature lower than the melting point of the polyester, typically, at a temperature of from 200° C. to 230° C. According to the invention, a polyester having an intrinsic viscosity (IV) of 0.7-1.0 dL/g is obtained as solid-polycondensate.

The polycondensation catalyst for producing polyester of the invention may be added to a reaction system when a direct esterification reaction or a transesterification reaction for producing a low molecular weight oligomer containing BHET is carried out, or alternatively it may be added to a reaction system when a low molecular weight oligomer is further subjected to polycondensation reaction after the oligomer has been obtained. The polycondensation catalyst of the invention may be added in the form of powder to a reaction system, or alternatively it may be added to a reaction system after being dispersed in glycol which is used as one of the raw materials. Since the polycondensation catalyst of the invention can be dispersed easily in glycol, especially in ethylene glycol, it is preferably added to a reaction system as such when a direct esterification reaction or a transesterification reaction for the production of the oligomer containing BHET is carried out.

As the polycondensation catalyst of the invention contains no antimony as an ingredient, it does not make resulting polyesters darkened, and yet it has catalyst activity equal to or higher than the catalysts containing antimony as an ingredient, providing polyesters with excellent color tone. Moreover, the polycondensation catalyst of the invention is not poisonous and hence safe.

Furthermore, the polycondensation catalyst of the invention exhibits a high catalytic activity in solid-polycondensation of polyester obtained in melt-polymerization. In particular, the polycondensation catalyst of the invention has a high solid-polymerization rate, that is, a high rate of increase of intrinsic viscosity per time, and provides a high molecular weight polyester having excellent color tone.

According to the invention, however, in the production of polyester, any conventionally known polycondensation catalyst, for example, such a catalyst comprised of compounds of antimony, germanium, cobalt, zinc, manganese, titanium, tin, aluminum and the like may be used together with the polycondensation catalyst of the invention unless the merit of use of the polycondensation catalyst of the invention is affected. Moreover, according to demand, polycondensation may be carried out in the presence of a phosphoric acid compound so that the resulting polyester is improved in heat stability as well as it is not colored.

The phosphoric acid compound may be added to a reaction system at any time before the polycondensation. The phosphoric acid compounds usable include, for example, phosphoric acid, a phosphoric acid salt such as sodium phosphate and potassium phosphate, a phosphoric acid ester such as trimethyl phosphate, triethyl phosphate, tri-n-butyl phosphate, phosphorous acid, a phosphorous acid salt such as sodium phosphite and potassium phosphite, a phosphorous acid ester such as triphenyl phosphite, and polyphosphoric acid. These phosphoric acid compounds are used in an amount in the range of from 1 ppm by weight to 100 ppm by weight, preferably in the range of from 10 ppm by weight to 50 ppm by weight, in terms of phosphorus (P), per weight of polyester to be obtained.

In the production of polyester by an esterification reaction or a transesterification reaction between a dicarboxylic acid or its ester-forming derivative and a glycol, it is presumed that the catalytic action of titanic acid is to coordinate, as a Lewis acid, to a carbonyl group of a dicarboxylic acid or its ester-forming derivative to make the attack of the glycol to the carbonyl carbon easy and simultaneously accelerate the dissociation of glycol to increase the nucleophilicity thereof. However, when the acidic catalytic action is too strong, undesirable side reactions probably occur to cause decomposition reaction or coloration of the resulting polyester.

As the polycondensation catalyst of the invention comprises a particle of the solid base having on the surface an inner coating layer of titanic acid and an outer coating layer of an oxide of at least one element selected from aluminum, zirconium and silicon, it is also presumed that the acidic catalytic action of titanic acid is made moderate, and in addition, the compatibility of the catalyst with polyester or the dispersibility of the catalyst in polyester is made moderate, and as a result, the polycondensation catalyst of the invention has a high polymerization activity, in particular, in solid-polycondensation, and provides high molecular weight polyester excellent in color tone.

EXAMPLES

The invention is explained with reference to examples below, but the invention is not limited at all by those examples. In the following examples, each of the amounts in weight of titanic acid, aluminum oxide, zirconium oxide and silicon oxide in relation to 100 parts by weight of a solid base in an obtained polycondensation catalyst is weight in terms of $TiO_2$, $Al_2O_3$, $ZrO_2$ and $SiO_2$, respectively.

Further in the following examples and comparative examples, the intrinsic viscosity of polyester obtained was measured in accordance with ISO 1628-1, and the color tone was measured using a color difference meter (SQ-2000, manufactured by Nippon Denshoku Instruments Co., Ltd.).

The melt-polycondensation rate in Table 1 was determined by dividing the intrinsic viscosity (IV) of the polyester obtained by melt-polycondensation by the melt-polycondensation time. The solid-polycondensation rate in Table 2 was determined by dividing the difference (ΔIV) between the intrinsic viscosity of the polyester (Table 2) obtained by solid-polycondensation of the polyester obtained by melt-polycondensation and the intrinsic viscosity of the polyester (Table 1) obtained by melt-polycondensation by the solid-polycondensation time.

Reference Example 1

Preparation of Aqueous Slurry of Magnesium Hydroxide

5 L of water was placed in a reactor, and then were added thereto 16.7 L of 4 mol/L aqueous solution of magnesium chloride and 8.4 L of 14.3 mol/L aqueous solution of sodium hydroxide simultaneously with stirring. Thereafter, the resulting mixture was subjected to a hydrothermal reaction at a temperature of 170° C. for 0.5 hours.

The thus obtained magnesium hydroxide was collected by filtration and washed with water. The resulting cake was resuspended in water to yield an aqueous slurry of magnesium hydroxide (123 g/L).

Reference Example 2

Preparation of Aqueous Slurry of Hydrotalcite

A mixed solution of 2.6 L of 3.8 mol/L aqueous solution of magnesium sulfate and 2.6 L of 0.85 mol/L aqueous solution of aluminum sulfate and a mixed solution of 2.8 L of 9.3 mol/L aqueous solution of sodium hydroxide and 2.6 L of 2.54 mol/L aqueous solution of sodium carbonate were added simultaneously to a reactor under stirring. Thereafter, a hydrothermal reaction was conducted at 180° C. for 2 hours. After completion of the reaction, the resulting slurry was filtered, washed with water, dried and pulverized, thereby providing hydrotalcite having a composition $Mg_{0.7}Al_{0.3}(OH)_2(CO_3)_{0.15} \cdot 0.48H_2O$. The hydrotalcite was suspended in water to yield an aqueous slurry of hydrotalcite (100 g/L).

Example 1

Preparation of Polycondensation Catalyst A 9.0 L of the aqueous slurry of magnesium hydroxide (123 g/L) obtained in Reference Example 1 was placed in a 25-L capacity reactor. Then, 3.2 L of an aqueous solution of titanium tetrachloride (69.2 g/L in terms of $TiO_2$) and 3.2 L of an aqueous solution of sodium hydroxide (99.6 g/L in terms of NaOH) were added dropwise simultaneously to the aqueous slurry of magnesium hydroxide over 4 hours so that the aqueous slurry had a pH of 10.0. After completion of the addition, the resultant was aged for one hour, and then filtered, and washed with water, thereby providing particles of magnesium hydroxide having on the surfaces an inner coating layer of titanic acid.

To the aqueous slurry of the particles of magnesium hydroxide having on the surfaces the inner coating layer thus obtained, 2.0 L of an aqueous solution of aluminum sulfate (224.3 g/L in terms of $Al_2O_3$) and an aqueous solution of sodium hydroxide were added simultaneously over 8 hours in order that the pH of the slurry reached 10.0. After completion of the addition, the resultant was aged for one hour, thereby forming an outer coating layer of an oxide of aluminum on the surface of the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst A of the invention which had 20 parts by weight of inner coating layer formed of titanic acid and 40 parts by weight of outer coating layer formed of oxide of aluminum, each in relation to 100 parts by weight of magnesium hydroxide.

(Production of Polyester a-1)

430 g of terephthalic acid and 190 g of ethylene glycol were placed in a reactor and stirred under a nitrogen atmosphere to prepare a slurry. An esterification reaction was performed over 4 hours while the temperature in the reactor was kept at a temperature of 250° C. and the relative pressure based on the atmospheric pressure was kept at $1.2 \times 10^5$ Pa. 500 g of the thus obtained low molecular weight oligomer was transferred to a polycondensation reactor held at a temperature of 250° C. and normal pressure under a nitrogen gas atmosphere.

A slurry was prepared by dispersing 0.019 g ($3.8 \times 10^{-3}$ parts by weight per 100 parts by weight of the low molecular weight oligomer) of the polycondensation catalyst A in ethylene glycol, and the slurry was then charged into the polycondensation reactor. Further, 0.028 g of an aqueous solution of phosphoric acid (0.024 g in terms of phosphoric acid; $5.6 \times 10^{-3}$ parts by weight per 100 parts by weight of the low molecular weight oligomer) was charged into the polycondensation reactor.

Subsequently, the temperature in the reactor was increased from 260° C. to 280° C. over one hour. While the temperature was maintained, the pressure was reduced from normal pressure to an absolute pressure of 40 Pa. Then, while the pressure was maintained, heating was continued to carry out melt-polycondensation reaction until a load applied to the motor of the stirrer reached the predetermined magnitude.

After the termination of the polycondensation reaction, the pressure in the reactor was returned to normal pressure with nitrogen gas. The resulting polyester was discharged in a form of strand through an outlet opening in the bottom of the reactor. The strand was rapidly cooled and cut, yielding pellets of polyester a-1.

The melt-polycondensation time in the production of the polyester, the intrinsic viscosity of the polyester obtained, the melt-polycondensation rate in the production of the polyester, and the color tone of the polyester obtained are shown in Table 1.

(Production of Polyester a-2)

After 20 g of pellets of the polyester a-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester a-2.

The solid-polycondensation time in the production of the polyester, the intrinsic viscosity of the polyester obtained, the solid-polycondensation rate in the production of the polyester, and the color tone of the polyester obtained are shown in Table 2.

Example 2

Preparation of Polycondensation Catalyst B 9.0 L of the aqueous slurry of magnesium hydroxide (123 g/L) obtained in Reference Example 1 was placed in a 25-L capacity reactor. To the slurry of magnesium hydroxide were added 3.2 L of aqueous solution of titanium tetrachloride (69.2 g/L in terms of $TiO_2$) and 3.2 L of aqueous solution of sodium hydroxide (99.6 g/L in terms of NaOH) dropwise simultaneously over four hours so that the pH of the slurry reached 10.0. After completion of the addition, the resultant was aged for one hour, followed by filtering and washing with water, to provide particles of magnesium hydroxide having thereon an inner coating layer formed of titanic acid.

2214 g of aqueous solution of zirconium oxychloride (10% by weight in terms of $ZrO_2$) and an aqueous solution of sodium hydroxide were added to the aqueous slurry of the particles of magnesium hydroxide having the inner coating layer thereon dropwise simultaneously over four hours so that the pH of the slurry reached 10.0. After completion of the addition, the resultant was aged for one hour, thereby forming an outer coating layer formed of zirconium oxide on the inner coating layer of the particles of magnesium hydroxide.

The thus obtained aqueous slurry of the particles of magnesium hydroxide having on the surfaces the inner coating layer and the outer coating layer was filtered, and the cake obtained was washed with water, and dried. The dried product was then disintegrated to provide a polycondensation catalyst B of the invention which had 20 parts by weight of inner coating layer formed of titanic acid and 20 parts by weight of outer coating layer formed of oxide of zirconium, each in relation to 100 parts by weight of the magnesium hydroxide.

(Production of Polyester b-1)

430 g of terephthalic acid and 190 g of ethylene glycol were placed in a reactor and stirred under a nitrogen atmosphere to prepare a slurry. An esterification reaction was performed over four hours while the temperature in the reactor was kept at a temperature of 250° C. and the relative pressure based on the atmospheric pressure was kept at $1.2 \times 10^5$ Pa. 500 g of the thus obtained low molecular weight oligomer was transferred to a polycondensation reactor held at a temperature of 250° C. and normal pressure under a nitrogen gas atmosphere.

A slurry was prepared by dispersing 0.019 g ($3.8 \times 10^{-3}$ parts by weight per 100 parts by weight of the low molecular weight oligomer) of the polycondensation catalyst B in ethylene glycol, and the slurry was then charged into the polycondensation reactor. Further, 0.028 g of an aqueous solution of phosphoric acid (0.024 g in terms of phosphoric acid; $5.6 \times 10^{-3}$ parts by weight per 100 parts by weight of the low molecular weight oligomer) was charged into the polycondensation reactor.

Subsequently, the temperature in the reactor was increased from 260° C. to 280° C. over one hour. While the temperature was maintained, the pressure was reduced from normal pressure to an absolute pressure of 40 Pa. Then, while the pressure was maintained, heating was continued to carry out melt-polycondensation reaction until a load applied to the motor of the stirrer reached the predetermined amount.

After the termination of the polycondensation reaction, the pressure in the reactor was returned to normal pressure with nitrogen gas. The resulting polyester was discharged in a form of strand through an outlet opening in the bottom of the reactor. The strand was rapidly cooled and cut, yielding pellets of polyester b-1.

The melt-polycondensation time in the production of the polyester, the intrinsic viscosity of the polyester obtained, the melt-polycondensation rate in the production of the polyester, and the color tone of the polyester obtained are shown in Table 1.

(Production of Polyester b-2)

After 20 g of pellets of the polyester b-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at a temperature of 225° C. for 18 hours to perform solid-polycondensation of polyester, thereby providing pellets of polyester b-2.

The solid-polycondensation time in the production of the polyester, the intrinsic viscosity of the polyester obtained, the solid-polycondensation rate in the production of the polyester, and the color tone of the polyester obtained are shown in Table 2.

Example 3

Preparation of Polycondensation Catalyst E 9.0 L of the aqueous slurry of magnesium hydroxide (123 g/L) obtained in Reference Example 1 was placed in a 25-L capacity reactor. Then, 3.2 L of an aqueous solution of titanium tetrachloride (69.2 g/L in terms of $TiO_2$) and 3.2 L of an aqueous solution of sodium hydroxide (99.6 g/L in terms of NaOH) were added dropwise simultaneously to the aqueous slurry of magnesium hydroxide over 4 hours so that the aqueous slurry had a pH of 10.0. After completion of the dropwise addition, the resultant was aged for one hour, and then filtered, and washed with water, thereby providing particles of magnesium hydroxide having on the surfaces an inner coating layer of titanic acid.

To the aqueous slurry of the particles of magnesium hydroxide having on the surfaces the inner coating layer thus obtained, 1572 g of an aqueous solution of sodium silicate (29% by weight in terms of $SiO_2$) and sulfuric acid were added until the pH of the slurry reached 8.5. After completion of the addition, the resultant was aged for one hour, thereby forming an outer coating layer of an oxide of silicon on the surface of the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst E of the invention which had 20 parts by weight of inner coating layer formed of titanic acid and 40 parts by weight of outer coating layer formed of oxide of silicon, each in relation to 100 parts by weight of magnesium hydroxide.

(Production of Polyester e-1)

The polycondensation catalyst E was used, and otherwise in the same manner as Example 1, polyester e-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester e-2)

After 20 g of pellets of the polyester e-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester e-2.

The solid-polycondensation time in the production of the polyester, the intrinsic viscosity of the polyester obtained, the solid-polycondensation rate in the production of the polyester, and the color tone of the polyester obtained are shown in Table 2.

Example 4

Preparation of Polycondensation Catalyst F 9.0 L of the aqueous slurry of magnesium hydroxide (123 g/L) obtained in Reference Example 1 was placed in a 25-L capacity reactor. Then, 3.2 L of an aqueous solution of titanium tetrachloride (69.2 g/L in terms of $TiO_2$) and 3.2 L of an aqueous solution of sodium hydroxide (99.6 g/L in terms of NaOH) were added dropwise simultaneously to the aqueous slurry of magnesium hydroxide over 4 hours so that the aqueous slurry had a pH of 10.0. After completion of the dropwise addition, the resultant was aged for one hour, and then filtered, and washed with water, thereby providing particles of magnesium hydroxide having on the surfaces an inner coating layer of titanic acid.

To the aqueous slurry of the particles of magnesium hydroxide having on the surfaces the inner coating layer thus obtained, 382 g of an aqueous solution of sodium silicate (29% by weight in terms of $SiO_2$) and 990 g of an aqueous solution of sodium aluminate (19% by weight in terms of $Al_2O_3$) were added, and then sulfuric acid were added until the pH of the slurry reached 8.5. After completion of the addition, the resultant was aged for one hour, thereby forming an outer coating layer formed of a composite oxide of silicon and aluminum on the surface of the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst F of the invention which had 20 parts by weight of inner coating layer formed of titanic acid and 40 parts by weight of outer coating layer formed of oxide of silicon and aluminum, each in relation to 100 parts by weight of magnesium hydroxide.

(Production of Polyester f-1)

The polycondensation catalyst F was used, and otherwise in the same manner as Example 1, polyester f-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester f-2)

After 20 g of pellets of the polyester e-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester f-2.

The solid-polycondensation time in the production of the polyester, the intrinsic viscosity of the polyester obtained, the solid-polycondensation rate in the production of the polyester, and the color tone of the polyester obtained are shown in Table 2.

Example 5

Preparation of Polycondensation Catalyst G 11.1 L of the aqueous slurry of hydrotalcite (100 g/L) obtained in Reference Example 2 was used, and otherwise in the same manner as Example 1, there was obtained a polycondensation catalyst G of the invention which had 20 parts by weight of inner coating layer formed of titanic acid and 40 parts by weight of outer coating layer formed of oxide of aluminum, each in relation to 100 parts by weight of hydrotalcite.

(Production of Polyester g-1)

The polycondensation catalyst G was used, and otherwise in the same manner as Example 1, polyester g-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester g-2)

After 20 g of pellets of the polyester g-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester g-2.

The solid-polycondensation time in the production of the polyester, the intrinsic viscosity of the polyester obtained, the solid-polycondensation rate in the production of the polyester, and the color tone of the polyester obtained are shown in Table 2.

Example 6

Preparation of Polycondensation Catalyst H 11.1 L of the aqueous slurry of hydrotalcite (100 g/L) obtained in Reference Example 2 was used, and otherwise in the same manner as Example 3, there was obtained a polycondensation catalyst H of the invention which had 20 parts by weight of inner coating layer formed of titanic acid and 40 parts by weight of outer coating layer formed of oxide of silicon, each in relation to 100 parts by weight of hydrotalcite.

(Production of Polyester h-1)

The polycondensation catalyst H was used, and otherwise in the same manner as Example 1, polyester h-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester h-2)

After 20 g of pellets of the polyester h-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester h-2.

The solid-polycondensation time in the production of the polyester, the intrinsic viscosity of the polyester obtained, the solid-polycondensation rate in the production of the polyester, and the color tone of the polyester obtained are shown in Table 2.

Example 7

Preparation of Polycondensation Catalyst I 11.1 L of the aqueous slurry of hydrotalcite (100 g/L) obtained in Reference Example 2 was used, and otherwise in the same manner as Example 4, there was obtained a polycondensation catalyst I of the invention which had 20 parts by weight of inner coating layer formed of titanic acid and 40 parts by weight of outer coating layer formed of composite oxide of silicon and aluminum, each in relation to 100 parts by weight of hydrotalcite.

(Production of Polyester i-1)

The polycondensation catalyst I was used, and otherwise in the same manner as Example 1, polyester i-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester i-2)

After 20 g of pellets of the polyester i-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester i-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 1

Preparation of Polycondensation Catalyst C 4.8 L of aqueous solution of titanium tetrachloride (69.2 g/L in terms of $TiO_2$) and 4.8 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were added dropwise simultaneously to the aqueous slurry of magnesium hydroxide over six hours so that the aqueous slurry had a pH of 10.0. After completion of the addition, the resultant was aged for one hour, thereby forming a coating layer formed of titanic acid on the surfaces of the particles of magnesium hydroxide.

The thus obtained aqueous slurry of the particles of magnesium hydroxide having on the surfaces the coating layer of titanic acid was filtered, and the cake obtained was washed with water, and dried. The dried product was then disintegrated to provide a polycondensation catalyst C as a comparative example. The catalyst had the coating layer formed of titanic acid in an amount of 30 parts by weight in terms of $TiO_2$ in relation to 100 parts by weight of the magnesium hydroxide.

(Production of Polyester c-1)

The polycondensation catalyst C was used, and otherwise in the same manner as Example 1, polyester c-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester c-2)

After 20 g of pellets of the polyester c-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at a temperature of 225° C. for 18 hours to perform solid-polycondensation of polyester, thereby providing polyester c-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 2

Preparation of Polycondensation Catalyst D 3.2 L of aqueous solution of titanium tetrachloride (69.2 g/L in terms of $TiO_2$) and 3.2 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were added dropwise simultaneously to the aqueous slurry of magnesium hydroxide over six hours so that the aqueous slurry had a pH of 10.0. After completion of the addition, the resultant was aged for one hour, thereby forming a coating layer formed of titanic acid on the surfaces of the particles of magnesium hydroxide.

The thus obtained aqueous slurry of particles of magnesium hydroxide having on the surfaces the coating layer of titanic acid was filtered, and the cake obtained was washed with water, and dried. The dried product was then disintegrated to provide a polycondensation catalyst D as a comparative example. The catalyst had the coating layer formed of titanic acid in an amount of 20 parts by weight in terms of $TiO_2$ in relation to 100 parts by weight of the magnesium hydroxide.

(Production of Polyester d-1)

The polycondensation catalyst D was used, and otherwise in the same manner as Example 1, polyester d-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester d-2)

After 20 g of pellets of the polyester d-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at a temperature of 225° C. for 18 hours to perform solid-polycondensation of polyester, thereby providing polyester d-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 3

Production of Polyester o-1

Polyester o-1 was obtained in the same manner as Example 1 except for using 0.098 g of antimony trioxide ($2.0 \times 10^{-2}$ parts by weight per 100 parts by weight of the low molecular weight oligomer) instead of polycondensation catalyst A. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester o-2)

After 20 g of pellets of the polyester o-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at a temperature of 225° C. for 18 hours to perform solid-polycondensation of polyester, thereby providing polyester o-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 4

Preparation of Polycondensation Catalyst J 9.0 L of the aqueous slurry of magnesium hydroxide (123 g/L) obtained in Reference Example 1 was placed in a 25-L capacity reactor, and then the temperature was increased to 60° C. While the temperature was maintained at 60° C., 1981.2 g of aqueous solution of sodium aluminate (19% by weight in terms of $Al_2O_3$) was added. Further, sulfuric acid was added until the pH reached 8.5, followed by ageing for 1 hour. The resulting slurry was filtered and washed with water, thereby forming an inner coating layer of oxide of aluminum on the surface of magnesium hydroxide particles.

To the slurry of magnesium hydroxide particles having the inner coating layer thereon, 3.2 L of aqueous solution of titanium tetrachloride (69.2 g/L in terms of $TiO_2$) and 3.2 L of aqueous solution of sodium hydroxide (99.6 g/L in terms of NaOH) were dropwise added simultaneously over 4 hours so that the pH of the slurry reached 10.0. After completion of the dropwise addition, ageing was conducted for 1 hour and thereby an outer coating layer of titanic acid was formed on the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst J as a comparative example which had 20 parts by weight of inner coating layer of oxide of aluminum and 20 parts by weight of outer coating layer formed of titanic acid, each in relation to 100 parts by weight of magnesium hydroxide.

(Production of Polyester j-1)

The polycondensation catalyst J was used, and otherwise in the same manner as Example 1, polyester j-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester j-2)

After 20 g of pellets of the polyester j-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester j-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 5

Preparation of Polycondensation Catalyst K 9.0 L of the aqueous slurry of magnesium hydroxide (123 g/L) obtained in Reference Example 1 was placed in a 25-L capacity reactor, and then the temperature was increased to 60° C. While the temperature was maintained, 2214 g of aqueous solution of zirconium oxychloride (10% by weight in terms of $ZrO_2$) was added. Further, an aqueous solution of sodium hydroxide was added until the pH reached 8.5, followed by ageing for 1 hour. The resulting slurry was filtered and washed with water, thereby forming an inner coating layer of oxide of zirconium on the surface of magnesium hydroxide particles.

To the slurry of magnesium hydroxide particles having the inner coating layer thereon, 3.2 L of aqueous solution of titanium tetrachloride (69.2 g/L in terms of $TiO_2$) and 3.2 L of aqueous solution of sodium hydroxide (99.6 g/L in terms of NaOH) were dropwise added simultaneously over 4 hours so that the pH of the slurry reached 10.0. After completion of the dropwise addition, ageing was conducted for 1 hour and thereby an outer coating layer of titanic acid was formed on the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst K as a comparative example which had 20 parts by weight of inner coating layer of oxide of zirconium and 20 parts by weight of outer coating layer formed of titanic acid, each in relation to 100 parts by weight of magnesium hydroxide.

(Production of Polyester k-1)

The polycondensation catalyst K was used, and otherwise in the same manner as Example 1, polyester k-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester k-2)

After 20 g of pellets of the polyester k-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester k-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 6

Preparation of Polycondensation Catalyst L 9.0 L of the aqueous slurry of magnesium hydroxide (123 g/L) obtained in Reference Example 1 was placed in a 25-L capacity reactor, and then the temperature was increased to 60° C. While the temperature was maintained, 763.6 g of aqueous solution of sodium silicate (29% by weight in terms of $SiO_2$) was added. Further, sulfuric acid was added until the pH reached 8.5, followed by ageing for 1 hour. The resulting slurry was filtered and washed with water, thereby forming an inner coating layer of oxide of silicon on the surface of magnesium hydroxide particles.

To the slurry of magnesium hydroxide particles having the inner coating layer thereon, 3.2 L of aqueous solution of titanium tetrachloride (69.2 g/L in terms of $TiO_2$) and 3.2 L of aqueous solution of sodium hydroxide (99.6 g/L in terms of NaOH) were dropwise added simultaneously over 4 hours so that the pH of the slurry reached 10.0. After completion of the dropwise addition, ageing was conducted for 1 hour and thereby an outer coating layer of titanic acid was formed on the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst L as a comparative example which had 20 parts by weight of inner coating layer of oxide of silicon and 20 parts by weight of outer coating layer formed of titanic acid, each in relation to 100 parts by weight of magnesium hydroxide.

(Production of Polyester l-1)

The polycondensation catalyst L was used, and otherwise in the same manner as Example 1, polyester l-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester l-2)

After 20 g of pellets of the polyester l-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester l-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 7

Preparation of Polycondensation Catalyst M 9.0 L of the aqueous slurry of magnesium hydroxide (123 g/L) obtained in Reference Example 1 was placed in a 25-L capacity reactor, and then the temperature was increased to 60° C. While the temperature was maintained, 382 g of aqueous solution of sodium silicate (29% by weight in terms of $SiO_2$) and 990.4 g of aqueous solution of sodium aluminate (19% by weight in terms of $Al_2O_3$) were added. Further, sulfuric acid was added until the pH reached 8.5, followed by ageing for 1 hour. The resulting slurry was filtered and washed with water, thereby forming an inner coating layer formed of composite oxide of silicon and aluminum on the surface of magnesium hydroxide particles.

To the slurry of magnesium hydroxide particles having the inner coating layer thereon, 3.2 L of aqueous solution of titanium tetrachloride (69.2 g/L in terms of $TiO_2$) and 3.2 L of aqueous solution of sodium hydroxide (99.6 g/L in terms of NaOH) were dropwise added simultaneously over 4 hours so that the pH of the slurry reached 10.0. After completion of the dropwise addition, ageing was conducted for 1 hour and thereby an outer coating layer of titanic acid was formed on the inner coating layer.

The thus obtained aqueous slurry of the particles of magnesium hydroxide having on the surfaces the inner coating layer and the outer coating layer was filtered, and the cake obtained was washed with water, and dried. The dried product was disintegrated to provide a polycondensation catalyst M as a comparative example which had 20 parts by weight of inner coating layer formed of composite oxide of silicon and aluminum and 20 parts by weight of outer coating layer formed of titanic acid, each in relation to 100 parts by weight of magnesium hydroxide.

(Production of Polyester m-1)

The polycondensation catalyst M was used, and otherwise in the same manner as Example 1, polyester m-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester m-2)

After 20 g of pellets of the polyester m-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester m-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 8

Preparation of Polycondensation Catalyst N 11.1 L of the aqueous slurry of hydrotalcite (100 g/L) obtained in Reference Example 2 was used, and otherwise in the same manner as Comparative Example 6, there was obtained a polycondensation catalyst N as a comparative example which had 20 parts by weight of inner coating layer formed of oxide of silicon and 20 parts by weight of outer coating layer formed of titanic acid, each in relation to 100 parts by weight of hydrotalcite.

(Production of Polyester n-1)

The polycondensation catalyst N was used, and otherwise in the same manner as Example 1, polyester n-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester n-2)

After 20 g of pellets of the polyester m-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester n-2.

The solid-polycondensation time in the production of the polyester, the intrinsic viscosity of the polyester obtained, the solid-polycondensation rate in the production of the polyester, and the color tone of the polyester obtained are shown in Table 2.

Comparative Example 9

Preparation of Polycondensation Catalyst P 11.1 L of the aqueous slurry of hydrotalcite (100 g/L) obtained in Reference Example 2 was used, and otherwise in the same manner as Comparative Example 2, there was obtained a polycondensation catalyst P as a comparative example which had 20 parts by weight of coating layer formed of titanic acid in relation to 100 parts by weight of hydrotalcite.

(Production of Polyester p-1)

The polycondensation catalyst P was used, and otherwise in the same manner as Example 1, polyester p-1 was obtained. The melt-polycondensation time in the production of the polyester, the intrinsic viscosity of the polyester obtained, the melt-polycondensation rate in the production of the polyester, and the color tone of the polyester obtained are shown in Table 1.

(Production of Polyester p-2)

After 20 g of pellets of the polyester p-1 was placed in a fixed bed circulation reactor, they were dried with stream of nitrogen at a temperature of 160° C. for four hours, and then crystallized at a temperature of 190° C. for one hour. The thus treated pellets of polyester were heated in a stream of nitrogen at 225° C. for 18 hours to perform solid-polycondensation of polyester, thereby providing polyester p-2.

The solid-polycondensation time in the production of the polyester, the intrinsic viscosity of the polyester obtained, the solid-polycondensation rate in the production of the polyester, and the color tone of the polyester obtained are shown in Table 2.

TABLE 1

| | Polyester | Polycondensation Catalyst | Melt-Polycondensation Time (min.) | Intrinsic Viscosity (IV) (dL/g) | Melt-Polycondensation Rate (IV/h) | Color Tone of Polyester | | |
|---|---|---|---|---|---|---|---|---|
| | | | | | | L | a | b |
| Example 1 | a-1 | A | 179 | 0.610 | 0.204 | 48.7 | 0.6 | 1.2 |
| Example 2 | b-1 | B | 183 | 0.647 | 0.212 | 52.9 | 0.1 | 1.7 |
| Example 3 | e-1 | E | 199 | 0.637 | 0.192 | 50.7 | 0.4 | 1.8 |
| Example 4 | f-1 | F | 187 | 0.645 | 0.207 | 51.3 | 0.3 | 1.6 |
| Example 5 | g-1 | G | 194 | 0.622 | 0.192 | 50.2 | 0.8 | 1.3 |
| Example 6 | h-1 | H | 180 | 0.615 | 0.205 | 51.0 | 0.7 | 1.4 |
| Example 7 | i-1 | I | 182 | 0.633 | 0.209 | 51.5 | 0.2 | 1.9 |

TABLE 1-continued

|  | Polyester | Polycondensation Catalyst | Melt-Polycondensation Time (min.) | Intrinsic Viscosity (IV) (dL/g) | Melt-Polycondensation Rate (IV/h) | Color Tone of Polyester L | a | b |
|---|---|---|---|---|---|---|---|---|
| Comparative 1 | c-1 | C | 197 | 0.644 | 0.196 | 51.1 | −0.8 | 1.7 |
| Comparative 2 | d-1 | D | 179 | 0.643 | 0.216 | 52.3 | −0.1 | 1.6 |
| Comparative 3 | o-1 | $Sb_2O_3$ | 232 | 0.643 | 0.166 | 49.9 | −1.3 | 2.5 |
| Comparative 4 | j-1 | J | 180 | 0.648 | 0.216 | 52.1 | 0.2 | 1.8 |
| Comparative 5 | k-1 | K | 183 | 0.653 | 0.214 | 51.7 | 0.6 | 1.7 |
| Comparative 6 | l-1 | L | 239 | 0.613 | 0.154 | 53.2 | 0.9 | 1.9 |
| Comparative 7 | m-1 | M | 200 | 0.650 | 0.195 | 52.9 | 0.2 | 1.6 |
| Comparative 8 | n-1 | N | 187 | 0.622 | 0.200 | 51.9 | 0.8 | 1.8 |
| Comparative 9 | p-1 | P | 180 | 0.642 | 0.214 | 53.8 | 0.1 | 1.9 |

TABLE 2

|  | Polyester | Polycondensation Catalyst | Solid-Polycondensation Time (h) | Intrinsic Viscosity (IV) (dL/g) | Solid-Polycondensation Rate (ΔIV/h) | Color Tone of Polyester L | a | b |
|---|---|---|---|---|---|---|---|---|
| Example 1 | a-2 | A | 18 | 0.847 | 0.0132 | 76.1 | 1.9 | 2.0 |
| Example 2 | b-2 | B | 18 | 0.850 | 0.0113 | 78.1 | 0.9 | 2.0 |
| Example 3 | e-2 | E | 18 | 0.849 | 0.0118 | 76.4 | 1.8 | 2.4 |
| Example 4 | f-2 | F | 18 | 0.842 | 0.0109 | 77.3 | 1.2 | 1.9 |
| Example 5 | g-2 | G | 18 | 0.828 | 0.0114 | 75.5 | 2.9 | 2.4 |
| Example 6 | h-2 | H | 18 | 0.833 | 0.0121 | 76.9 | 1.6 | 2.2 |
| Example 7 | i-2 | I | 18 | 0.821 | 0.0104 | 77.0 | 0.7 | 1.9 |
| Comparative 1 | c-2 | C | 18 | 0.816 | 0.0096 | 78.1 | 0.7 | 1.7 |
| Comparative 2 | d-2 | D | 18 | 0.740 | 0.0054 | 78.8 | 0.8 | 1.9 |
| Comparative 3 | o-2 | $Sb_2O_3$ | 18 | 0.848 | 0.0114 | 76.4 | −1.5 | 2.0 |
| Comparative 4 | j-2 | J | 18 | 0.786 | 0.0077 | 77.9 | 1.1 | 3.7 |
| Comparative 5 | k-2 | K | 18 | 0.792 | 0.0077 | 75.8 | 0.8 | 3.4 |
| Comparative 6 | l-2 | L | 18 | 0.749 | 0.0076 | 80.9 | 0.1 | 3.3 |
| Comparative 7 | m-2 | M | 18 | 0.786 | 0.0076 | 78.4 | 0.2 | 4.0 |
| Comparative 8 | n-2 | N | 18 | 0.788 | 0.0092 | 80.4 | 1.3 | 3.8 |
| Comparative 9 | p-2 | P | 18 | 0.813 | 0.0095 | 78.4 | 1.0 | 3.8 |

As shown in Table 2, the catalyst of the invention provides polyester having high molecular weight and excellent color tone at a polymerization activity in solid-polycondensation or at a rate of increase of intrinsic viscosity per time substantially equal to that of the antimony catalyst and higher than that of the conventional titanic acid catalyst.

The invention claimed is:

1. A polycondensation catalyst for producing polyester by an esterification reaction or a transesterification reaction between a dicarboxylic acid or an ester-forming derivative thereof and a glycol, wherein the polycondensation catalyst comprises particles of a solid base having on the surfaces an inner coating layer of titanic acid in an amount of from 0.1 to 50 parts by weight in terms of $TiO_2$ per 100 parts by weight of the solid base, and an outer coating layer either of an oxide of at least one element selected from aluminum, zirconium and silicon, or of a composite oxide of at least two elements selected from aluminum, zirconium and silicon on the surface of the inner coating layer in an amount of from 1 to 50 parts by weight per 100 parts by weight of the solid base.

2. The polycondensation catalyst according to claim 1, wherein the solid base is magnesium hydroxide.

3. The polycondensation catalyst according to claim 1, wherein the solid base is hydrotalcite.

4. A method for producing polyester comprising preparing an oligomer comprising a bis(hydroxyalkyl) ester of an aromatic dicarboxylic acid by an esterification reaction or a transesterification reaction between the aromatic dicarboxylic acid or an ester-forming derivative thereof and an alkylene glycol, and then subjecting the oligomer to melt-polycondensation in the presence of the polycondensation catalyst according to claim 1.

5. A method for producing polyester comprising subjecting a dicarboxylic acid or an ester-forming derivative thereof and a glycol to melt-polycondensation in the presence of the polycondensation catalyst according to claim 1.

6. The method for producing polyester according to claim 5, wherein the resulting polyester is further subjected to solid-polycondensation.

7. A method for producing a polycondensation catalyst for producing polyester by an esterification reaction or a transesterification reaction between a dicarboxylic acid or an ester-forming derivative thereof and a glycol, the polycondensation catalyst comprising particles of a solid base having on the surfaces an inner coating layer and an outer coating layer, wherein the method comprises:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from a water-soluble aluminum salt and a water-soluble zirconium salt and an aqueous solution of an alkali to the resulting aqueous slurry of the particles of the solid base thereby to form an outer coating layer of an oxide of at least one element selected from aluminum and zirconium, or of a composite oxide of aluminum and zirconium on the surface of the inner coating layer; and filtering the aqueous slurry of the particles of the solid base having the inner coating layer and the outer coating layer thereon, washing with water and drying the obtained cake, followed by disintegrating the obtained dried product.

8. A method for producing a polycondensation catalyst for producing polyester by an esterification reaction or a transesterification reaction between a dicarboxylic acid or an ester-forming derivative thereof and a glycol, the polycondensation catalyst comprising particles of a solid base having on the surfaces an inner coating layer and an outer coating layer, wherein the method comprises:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of a water-soluble silicate and an acid to the resulting aqueous slurry of the particles of the solid base thereby to form an outer coating layer of an oxide of silicon on the surface of the inner coating layer; and filtering the aqueous slurry of the particles of the solid base having the inner coating layer and the outer coating layer thereon, washing with water and drying the obtained cake, followed by disintegrating the obtained dried product.

9. A method for producing a polycondensation catalyst for producing polyester by an esterification reaction or a transesterification reaction between a dicarboxylic acid or an ester-forming derivative thereof and a glycol, the polycondensation catalyst comprising particles of a solid base having on the surfaces an inner coating layer and an outer coating layer, wherein the method comprises:

adding an aqueous solution of a titanium compound and an aqueous solution of an alkali to an aqueous slurry of particles of a solid base so that the aqueous slurry has a pH in a range of 5 to 12 thereby to form an inner coating layer of titanic acid on the surfaces of the particles of the solid base;

adding an aqueous solution of at least one selected from a water-soluble aluminum salt and a water-soluble zirconium salt, and an aqueous solution of a water-soluble silicate to the resulting aqueous slurry of the particles of the solid base thereby to form an outer coating layer of a composite oxide of at least one element selected from aluminum and zirconium, and silicon on the surface of the inner coating layer; and filtering the aqueous slurry of the particles of the solid base having the inner coating layer and the outer coating layer thereon, washing with water and drying the obtained cake, followed by disintegrating the obtained dried product.

* * * * *